US012621260B2

(12) United States Patent
Denny-Brown et al.

(10) Patent No.: US 12,621,260 B2
(45) Date of Patent: May 5, 2026

(54) DATA PROTECTION IN CLOUD DATA PLATFORM

(71) Applicant: Snowflake Inc., Bozeman, MT (US)

(72) Inventors: Derek Denny-Brown, Seattle, WA (US); Ajay Shridhar Joshi, Kirkland, WA (US); Xuguang Yang, Bellevue, WA (US); Haowei Yu, Newark, CA (US); Thant Htoo Zaw, San Mateo, CA (US)

(73) Assignee: Snowflake Inc., Bozeman, MT (US)

( * ) Notice: Subject to any disclaimer, the term of this patent is extended or adjusted under 35 U.S.C. 154(b) by 65 days.

(21) Appl. No.: 18/830,859

(22) Filed: Sep. 11, 2024

(65) Prior Publication Data

US 2026/0075029 A1 Mar. 12, 2026

(51) Int. Cl.
| | |
|---|---|
| *G06F 15/16* | (2006.01) |
| *H04L 61/256* | (2022.01) |
| *H04L 61/4511* | (2022.01) |

(52) U.S. Cl.
CPC ........ *H04L 61/4511* (2022.05); *H04L 61/256* (2013.01)

(58) Field of Classification Search
CPC ............................ H04L 61/4511; H04L 61/256
See application file for complete search history.

(56) References Cited

U.S. PATENT DOCUMENTS

| | | | | |
|---|---|---|---|---|
| 10,567,288 | B1 * | 2/2020 | Mutnuru | ............. H04L 67/1019 |
| 11,528,201 | B1 * | 12/2022 | Richards | .............. H04L 43/062 |
| 2010/0161759 | A1 * | 6/2010 | Brand | ...................... H04L 69/04 |
| | | | | 709/218 |
| 2013/0346576 | A1 * | 12/2013 | Huang | .................... H04L 61/00 |
| | | | | 709/223 |
| 2016/0234163 | A1 * | 8/2016 | Nistor | ................. H04L 61/4511 |
| 2016/0241509 | A1 * | 8/2016 | Akcin | ................. H04L 61/4511 |
| 2017/0324632 | A1 * | 11/2017 | Arora | ...................... H04L 43/04 |
| 2018/0176130 | A1 * | 6/2018 | Banerjee | ............. H04L 61/2557 |

* cited by examiner

*Primary Examiner* — Razu A Miah
(74) *Attorney, Agent, or Firm* — Schwegman Lundberg & Woessner, P.A.

(57) ABSTRACT

A system is disclosed comprising a memory containing instructions and one or more computer processors. When the instructions are executed, the system performs an operation to configure a Domain Name System (DNS) proxy, executing in a node of a cloud data platform associated with a first account, to perform hostname resolution of an Account Host Identifier (AHID) of the first account. The DNS proxy receives a DNS request from a process executing in a pod of the node, and the system fails to resolve the DNS request if the name in the DNS request differs from the AHID of the first account. The system returns an Internet Protocol (IP) address if the name in the DNS request matches the AHID. The process executing in the pod of the node is configured to send data to data storage of the cloud data platform using the returned IP address.

14 Claims, 7 Drawing Sheets

SECURE SETUP OF EXECUTION NODES

400

CREATE EXECUTION NODES — 402

CONFIGURE DNS PROXY IN EACH NODE TO SOLVE DOMAIN NAME FOR UNIQUE HOST ID AND DISCARD UNSUPPORTED HOST NAMES — 404

CREATE IP TABLES AT EACH EXECUTION NODE — 406

CONFIGURE IP CHECKER AT EACH NODE TO VALIDATE IP ADDRESSES BASED ON IP TABLES — 408

CONFIGURE EBPF AT EACH NODE TO PERFORM SNI VALIDATION DURING TLS HANDSHAKE — 410

SECURE STAGE ACCESS

500

PUT @stage-Id file:///filepath ~ 502

HTTP POST to <Account-host-identifier>/<stage-Id_suffix> ~ 504

DNS for host <Account-host-identifier> resolved to internal IP (e.g., 169.254.10.8) ~ 506

TLS handshake with <Account-host-identifier> ~ 508

Perform data transfer ~ 510

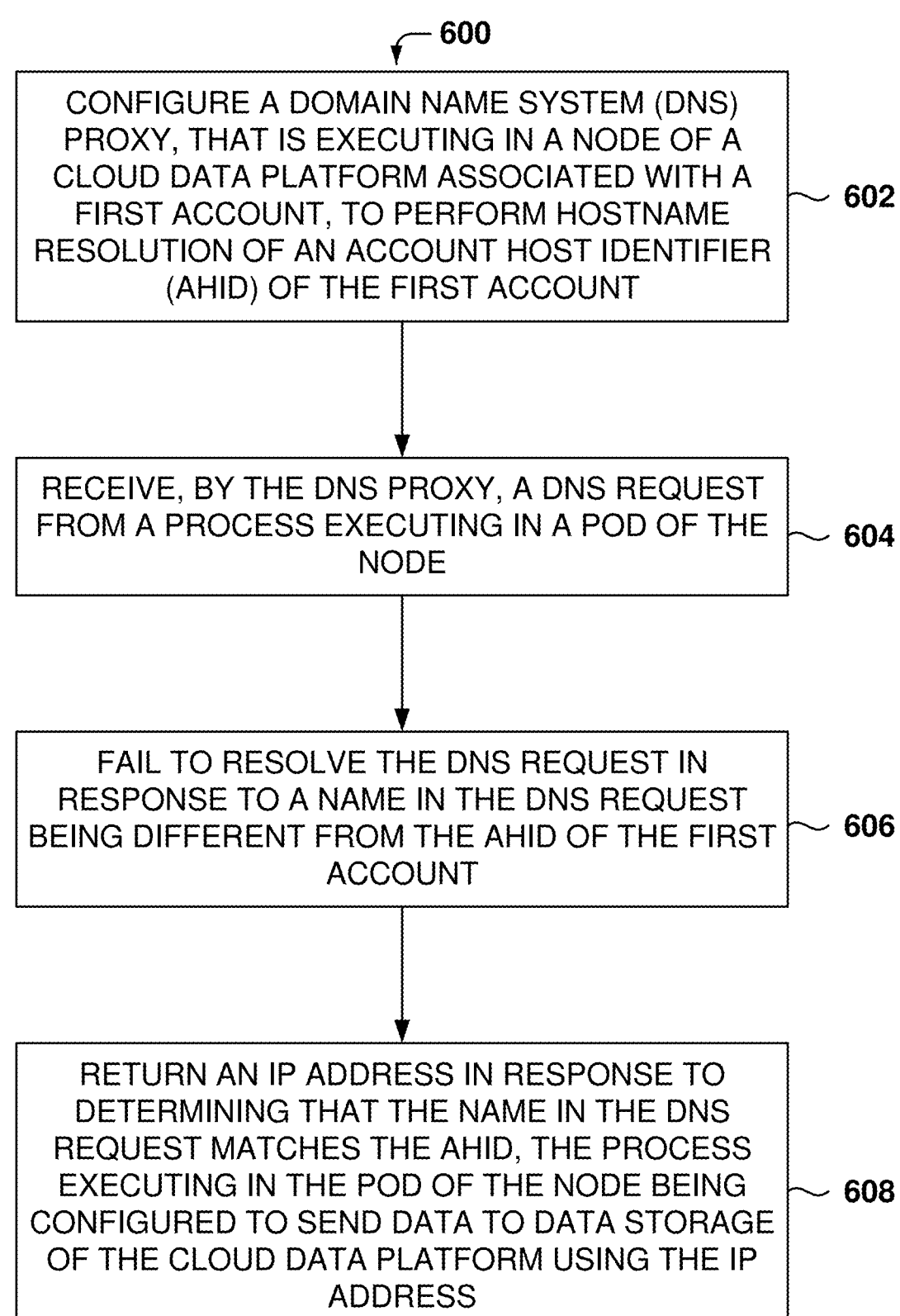

— 600

CONFIGURE A DOMAIN NAME SYSTEM (DNS) PROXY, THAT IS EXECUTING IN A NODE OF A CLOUD DATA PLATFORM ASSOCIATED WITH A FIRST ACCOUNT, TO PERFORM HOSTNAME RESOLUTION OF AN ACCOUNT HOST IDENTIFIER (AHID) OF THE FIRST ACCOUNT — 602

RECEIVE, BY THE DNS PROXY, A DNS REQUEST FROM A PROCESS EXECUTING IN A POD OF THE NODE — 604

FAIL TO RESOLVE THE DNS REQUEST IN RESPONSE TO A NAME IN THE DNS REQUEST BEING DIFFERENT FROM THE AHID OF THE FIRST ACCOUNT — 606

RETURN AN IP ADDRESS IN RESPONSE TO DETERMINING THAT THE NAME IN THE DNS REQUEST MATCHES THE AHID, THE PROCESS EXECUTING IN THE POD OF THE NODE BEING CONFIGURED TO SEND DATA TO DATA STORAGE OF THE CLOUD DATA PLATFORM USING THE IP ADDRESS — 608

FIG. 6

DATA PROTECTION IN CLOUD DATA PLATFORM

TECHNICAL FIELD

The subject matter disclosed herein generally relates to methods, systems, and machine-readable storage media for protecting user data in a Virtual Private Cloud (VPC) deployment.

BACKGROUND

Data platforms are widely used for data storage and data access in computing and communication contexts. With respect to architecture, a data platform could be an on-premises data platform, a network-based data platform (e.g., a cloud-based data platform), a combination of the two, or include another type of architecture.

Processes that are associated with a user account may, via one or more types of clients, be able to cause data to be ingested into the database and may also be able to manipulate the data, add additional data, remove data, run queries against the data, generate views of the data, and so forth.

However, a malicious app (application) producer can develop malicious software that can be distributed into the data platform to the accounts of app consumers. The malicious app aims to copy the user's data to the account of the app producer, such as by using the cloud storage of the app producer to save the user's data. Thus, the execution of third-party malicious code within a client's environment poses a risk, as it may facilitate the unauthorized transfer of data through internal stages, which are abstractions built on blob storage systems.

BRIEF DESCRIPTION OF THE DRAWINGS

Various appended drawings illustrate examples of the present disclosure and cannot be considered limiting its scope.

FIG. 6 is a flowchart of a method for protecting data in a VPC implementation, according to some examples.

DETAILED DESCRIPTION

Figure 1:
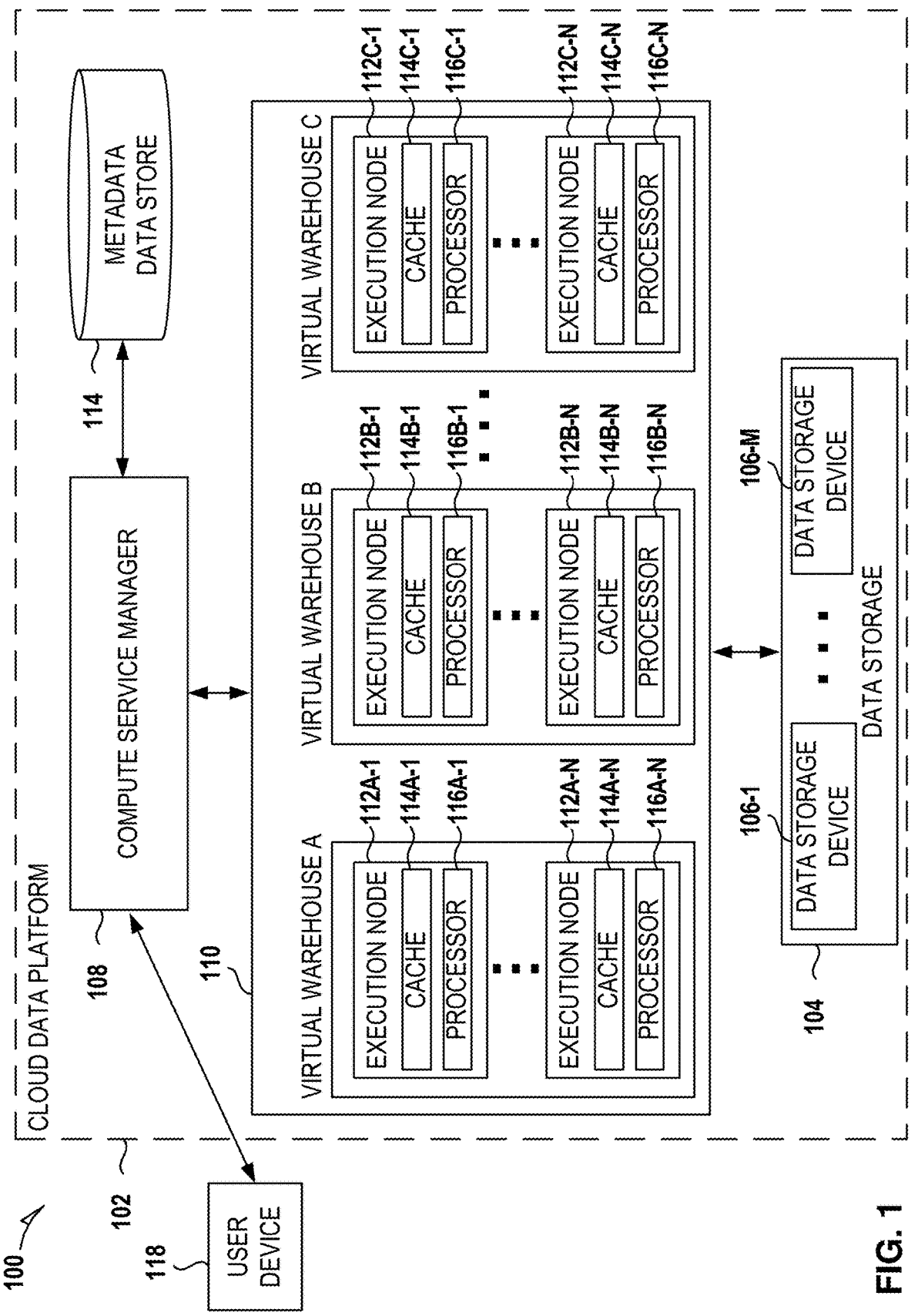
FIG. 1 illustrates a computing environment that includes a cloud data platform, according to some examples.

Reference will now be made in detail to specific examples for carrying out the inventive subject matter. Examples are illustrated in the accompanying drawings, and specific details are set forth in the following description to provide a thorough understanding of the subject matter. It will be understood that these examples are not intended to limit the scope of the claims to the illustrated techniques. On the contrary, they are intended to cover such alternatives, modifications, and equivalents as may be included within the scope of the disclosure.

A stage is a location where data files are stored. In some implementations, three types of stages are implemented: internal, external, and temporary. Internal Stages are managed by the cloud data platform; external stages are kept in cloud storage services (e.g., Amazon S3™, Azure Blob Storage, Google Cloud Storage); and temporary states are internal stages available for the duration of a session and are automatically removed when the session is finished.

Although some examples are presented below with reference to a particular cloud provider, the same principles may be utilized with any of the cloud providers. Therefore, the solutions described for a given cloud provider should not be interpreted to be exclusive or limiting but rather illustrative.

In some implementations, internal stages of user accounts are located in the same cloud storage (e.g., S3 bucket). When accessing their internal stage, a user is given a temporary session token scoped down to their specific stage's path suffix. However, with the added feature of enabling app sharing within the data platform, several potential security vulnerabilities arise when external apps execute in the data platform.

In one attack paradigm, a malicious app producer executes in a user space (e.g., a user working pod). The app producer is the user who creates the app, and the app consumer is the user who executes the app in their own user space (e.g., user account). The attack includes embedding, by the executing app, a "Troy" session token obtained elsewhere, with write access to storage controlled by the producer (e.g., the producer's internal stage). When the consumer runs the app in their legitimate cluster, the malicious code can use the illicit token to exfiltrate the consumer's data to the producer's internal stage.

Techniques are presented below to stop malicious apps from stealing user data. The solution is a multi-line defense system with three layers of defense:

1. A unique block-storage hostname per account is used for the block-storage service used (e.g., S3). This enables the data platform to block cross-account data exfiltration. The unique block-storage hostname is referred to herein as an Account Host Identifier (AHID). If the AHID of an account is used in another account, then the cloud data platform will disable communications using the AHID of the other account. Further, an internal stage is accessed using an Internal Stage Uniform Resource Locator (ISURL), which is a URL formed by combining the AHID with a suffix that identifies the path to the stage.

2. A Domain Name System (DNS) proxy that limits hostname resolution to the unique AHID of the account. DNS requests for hostnames different from the AHID are denied, ensuring that an attacker cannot submit DNS requests for a malicious destination (e.g., the account of the app producer).

3. A filter for Server Name Indication (SNI) requests. SNI is an extension to the Transport Layer Security (TLS) protocol that allows a client to specify the hostname to which they are trying to connect during the handshake process. The SNI filter inspects the TLS handshake for each connection and ensures that the request is for the allowed unique AHID; otherwise, the TLS handshake is disallowed and cannot be bypassed, thereby disabling the app from communicating with an unauthorized host.

FIG. 1 illustrates a computing environment 100 that includes a cloud data platform 102 (CDF), according to some examples. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein.

As shown, the cloud data platform 102 comprises a three-tier architecture: a compute service manager 108 coupled to a metadata data store 114, an execution platform 110, and data storage 104. The cloud data platform 102 hosts and provides data access, management, reporting, and analysis services to multiple client accounts. Administrative users can create and manage identities (e.g., users, roles, and groups) and use permissions to allow or deny access to the identities to resources and services. The cloud data platform 102 is used for reporting and analysis of integrated data from one or more disparate sources, including storage devices within the data storage 104. The data storage 104 comprises a plurality of computing machines and provides on-demand data storage resources to the cloud data platform 102.

The compute service manager 108 includes multiple services that coordinate and manage operations of the cloud data platform 102. For example, the compute service manager 108 is responsible for performing query optimization and compilation as well as managing clusters of compute nodes that perform query processing (also referred to as "virtual warehouses"). The compute service manager 108 can support any number of client accounts, such as end users providing data storage and retrieval requests, system administrators managing the systems and methods described herein, and other components/devices that interact with compute service manager 108.

The compute service manager 108 is also coupled to the metadata data store 114. The metadata data store 114 stores metadata pertaining to various functions and aspects associated with the cloud data platform 102 and its users. The metadata data store 114 also includes a summary of data stored in data storage 104 as well as data available from local caches. Additionally, the metadata data store 114 includes information regarding how data is organized in the data storage 104 and the local caches.

The compute service manager 108 is in communication with a user device 118. The user device 118 corresponds to a user of one of the multiple client accounts supported by the cloud data platform 102. In some implementations, the compute service manager 108 does not receive any direct communications from the user device 118 and only receives communications concerning jobs from a queue within the cloud data platform 102.

The compute service manager 108 is coupled to the metadata data store 114. The metadata data store 114 stores metadata pertaining to various functions and aspects associated with the cloud data platform 102 and its users. The metadata data store 114 also includes a summary of data stored in data storage 104 as well as data available from local caches. Additionally, the metadata data store 114 includes information regarding how data is organized in the data storage 104 and the local caches.

The compute service manager 108 is further coupled to the execution platform 110, which includes multiple virtual warehouses (computing clusters) that execute various data storage and data retrieval tasks. As an example, a set of processes on a compute node executes at least a portion of a query plan compiled by the compute service manager 108. As shown, the execution platform 110 includes virtual warehouse A, virtual warehouse B, and virtual warehouse C. Each virtual warehouse includes multiple execution nodes, each with a data cache and a processor. For example, as shown, virtual warehouse A includes execution nodes 112A-1 to 112A-N; execution node 112A-1 includes a cache 114A-1 and a processor 116A-1; and execution node 112A-N includes a cache 114A-N and a processor 116A-N. Similarly, in this example, virtual warehouse B includes execution nodes 112B-1 to 112B-N; execution node 112B-1 includes a cache 114B-1 and a processor 116B-1; and execution node 112B-N includes a cache 114B-N and a processor 116B-N. Additionally, virtual warehouse C includes execution nodes 112C-1 to 112C-N; execution node 112C-1 includes a cache 114C-1 and a processor 116C-1; and execution node 112C-N includes a cache 114C-N and a processor 116C-N.

Each execution node of the execution platform 110 is configured to process data storage and retrieval tasks. Hence, the virtual warehouses can execute multiple tasks in parallel utilizing the multiple execution nodes. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

In some examples, the execution nodes of the execution platform 110 are stateless with respect to the data the execution nodes are caching. That is, the execution nodes do not store or otherwise maintain state information about the execution node or the data being cached by a particular execution node, in these examples. Thus, in the event of an execution node failure, the failed node can be transparently replaced by another node. Since there is no state information associated with the failed execution node, the new (replacement) execution node can easily replace the failed node without concern for recreating a particular state.

The execution platform 110 may include any number of virtual warehouses. Additionally, the number of virtual warehouses in the execution platform 110 is dynamic, such that new virtual warehouses are created when additional processing and/or caching resources are needed. Similarly, existing virtual warehouses may be deleted when the resources associated with the virtual warehouse are no longer necessary.

Although each virtual warehouse shown in FIG. 1 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary. Additionally, although the execution nodes shown in the example of FIG. 1 each include a single data cache and a single processor, in other examples, execution nodes can contain any number of processors and any number of caches. Also, the caches may vary in size among the different execution nodes.

In some examples, the virtual warehouses of the execution platform 110 operate on the same data, but each virtual warehouse has its own execution nodes with independent processing and caching resources. This configuration allows requests on different virtual warehouses to be processed independently and with no interference between the requests. This independent processing, combined with the ability to add and remove virtual warehouses dynamically, supports the addition of new processing capacity for new users without impacting the performance observed by the existing users.

Although virtual warehouses A, B, and C are illustrated with an association with the same execution platform 110, the virtual warehouses may be implemented using multiple computing systems at multiple geographic locations. For example, virtual warehouse A can be implemented by a computing system at a first geographic location, while virtual warehouses B and C are implemented by another computing system at a second geographic location. In some examples, these different computing systems are cloud-based computing systems maintained by one or more different entities.

The execution platform 110 is coupled to data storage 104. The data storage 104 comprises multiple data storage devices 106-1 to 106-M. In some embodiments, the data storage devices 106-1 to 106-M are cloud-based storage devices located in one or more geographic locations. For example, the data storage devices 106-1 to 106-M may be part of a public cloud infrastructure or a private cloud infrastructure. The data storage devices 106-1 to 106-M may be hard disk drives (HDDs), solid state drives (SSDs), storage clusters, Amazon S3™ storage systems, or any other data storage technology. Additionally, the data storage 104 may include distributed file systems (e.g., Hadoop Distributed File Systems (HDFS)), object storage systems, and the like. In some examples, the storage devices 106-1 to 106-M are managed and provided by a third-party data storage platform (e.g., AWS®, Microsoft Azure Blob Storage®, or Google Cloud Storage®).

Each virtual warehouse can access any of the data storage devices 106-1 to 106-M shown in FIG. 1. Thus, the virtual warehouses are not necessarily assigned to a specific data storage device 106-1 to 106-M and, instead, can access data from any of the data storage devices 106-1 to 106-M within the data storage 104. Similarly, each of the execution nodes shown in FIG. 1 can access data from any of the data storage devices 106-1 to 106-M. In some examples, a particular virtual warehouse or a particular execution node may be temporarily assigned to a specific data storage device, but the virtual warehouse or execution node may later access data from any other data storage device.

In some examples, communication links between elements of the computing environment 100 are implemented via one or more data communication networks. These data communication networks may utilize any communication protocol and any type of communication medium. In some examples, the data communication networks are a combination of two or more data communication networks (or sub-networks) coupled to one another.

As shown in FIG. 1, the data storage devices 106-1 to 106-M are decoupled from the computing resources associated with the execution platform 110. This architecture supports dynamic changes to the cloud data platform 102 based on the changing data storage/retrieval needs as well as the changing needs of the users and systems. The support of dynamic changes allows the cloud data platform 102 to scale quickly in response to changing demands on the systems and components within the cloud data platform 102. The decoupling of the computing resources from the data storage devices supports the storage of large amounts of data without requiring a corresponding large amount of computing resources. Similarly, this decoupling of resources supports a significant increase in the computing resources utilized at a particular time without requiring a corresponding increase in the available data storage resources.

During typical operation, the cloud data platform 102 processes multiple jobs determined by the compute service manager 108. These jobs are scheduled and managed by the compute service manager 108 to determine when and how to execute the job. For example, the compute service manager 108 may divide the job into multiple discrete tasks and may determine what data is needed to execute each of the multiple discrete tasks. The compute service manager 108 may assign each of the multiple discrete tasks to one or more execution nodes of the execution platform 110 to process the task. The compute service manager 108 may determine what data is needed to process a task and further determine which nodes within the execution platform 110 are best suited to process the task. Some nodes may have already cached the data needed to process the task and, therefore, be a good candidate for processing the task. Metadata stored in the metadata data store 114 assists the compute service manager 108 in determining which nodes in the execution platform 110 have already cached at least a portion of the data needed to process the task. One or more nodes in the execution platform 110 processes the task using data cached by the nodes and, if necessary, data retrieved from the data storage 104.

The compute service manager 108, metadata data store 114, execution platform 110, and data storage 104 are shown in FIG. 1 as individual discrete components. However, each of the compute service manager 108, metadata data store 114, execution platform 110, and data storage 104 may be implemented as a distributed system (e.g., distributed across multiple systems/platforms at multiple geographic locations). Additionally, each of the compute service manager 108, metadata data store 114, execution platform 110, and data storage 104 can be scaled up or down (independently of one another) depending on changes to the requests received and the changing needs of the cloud data platform 102. Thus, in the described embodiments, the cloud data platform 102 is dynamic and supports regular changes to meet the current data processing needs.

As shown in FIG. 1, the computing environment 100 separates the execution platform 110 from the data storage 104. In this arrangement, the processing resources and cache resources in the execution platform 110 operate independently of the data storage devices 106-1 to 106-M in the data storage 104. Thus, the computing resources and cache resources are not restricted to specific data storage devices 106-1 to 106-M. Instead, all computing resources and all cache resources may retrieve data from and store data to any of the data storage resources in the data storage 104.

Figure 2:
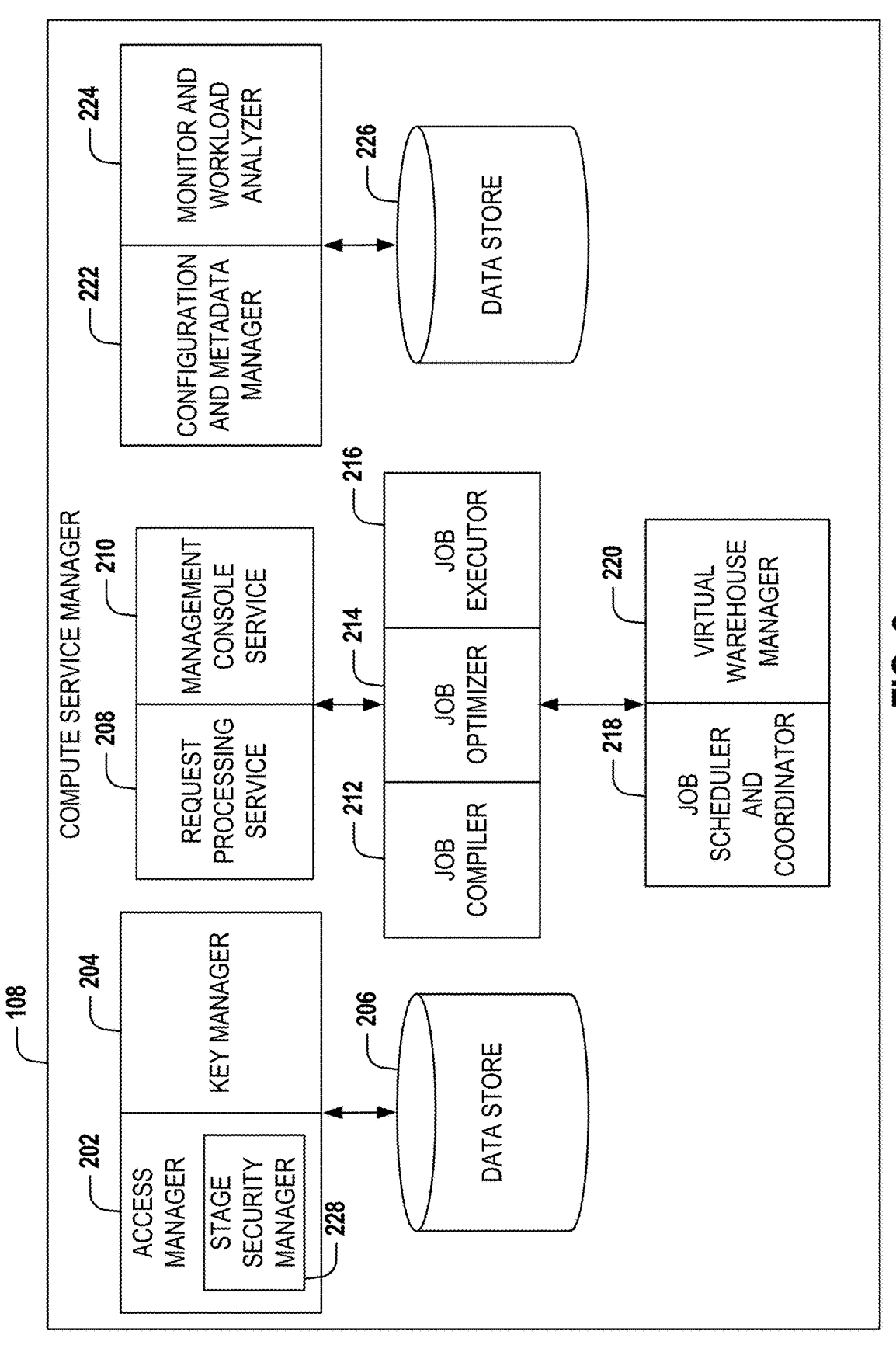
FIG. 2 is a block diagram illustrating components of a compute service manager of the cloud data platform, according to some examples.

FIG. 2 is a block diagram illustrating components of the compute service manager 108 of the cloud data platform, according to some examples. As shown in FIG. 2, the compute service manager 108 includes an access manager 202 and a key manager 204 coupled to a data store 206 that stores access information. Access manager 202 handles authentication and authorization tasks for the systems described herein. The access manager 202 includes a stage security manager 228 that configures and manages services for the security of stages used by user accounts, as described in more detail below with reference to FIGS. 3-6.

Key manager 204 manages the storage and authentication of keys used during authentication and authorization tasks. For example, access manager 202 and key manager 204 manage the keys used to access data stored in remote storage devices (e.g., data storage devices in data storage 104).

A request processing service 208 manages received data storage requests and data retrieval requests (e.g., jobs to be performed on database data). For example, the request processing service 208 may determine the data necessary to process a received query (e.g., a data storage request or data retrieval request). The data may be stored in a cache within the execution platform 110 or in a data storage device in data storage 104.

A management console service 210 supports access to various systems and processes by administrators and other system managers. Additionally, the management console service 210 may receive a request to execute a job and monitor the workload on the system.

The compute service manager 108 also includes a job compiler 212, a job optimizer 214, and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. The job optimizer 214 also handles various data pruning operations and other data optimization techniques to improve the speed and efficiency of executing the job. The job executor 216 executes the execution code for jobs received from a queue or determined by the compute service manager 108.

A job scheduler and coordinator 218 sends received jobs to the appropriate services or systems for compilation, optimization, and dispatch to the execution platform 110. For example, jobs may be prioritized and processed in that prioritized order. In some examples, the job scheduler and coordinator 218 identifies or assigns particular nodes in the execution platform 110 to process particular tasks.

A virtual warehouse manager 220 manages the operation of multiple virtual warehouses implemented in the execution platform 110. As discussed below, each virtual warehouse includes multiple execution nodes that each include a cache and a processor.

Additionally, the compute service manager 108 includes a configuration and metadata manager 222, which manages the information related to the data stored in the remote data storage devices and in the local caches (e.g., the caches in execution platform 110). The configuration and metadata manager 222 uses the metadata to determine which storage units need to be accessed to retrieve data for processing a particular task or job. A monitor and workload analyzer 224 oversees processes performed by the compute service manager 108 and manages the distribution of tasks (e.g., workload) across the virtual warehouses and execution nodes in the execution platform 110. The monitor and workload analyzer 224 also redistributes tasks, as needed, based on changing workloads throughout the cloud data platform 102 and may further redistribute tasks based on a user (e.g., "external") query workload that may also be processed by the execution platform 110. The configuration and metadata manager 222 and the monitor and workload analyzer 224 are coupled to a data store 226. Data store 226 in FIG. 2 represents any data repository or device within the cloud data platform 102. For example, data store 226 may represent caches in execution platform 110, storage devices in data storage 104, the metadata data store 114, or any other storage device or system.

Figure 3:
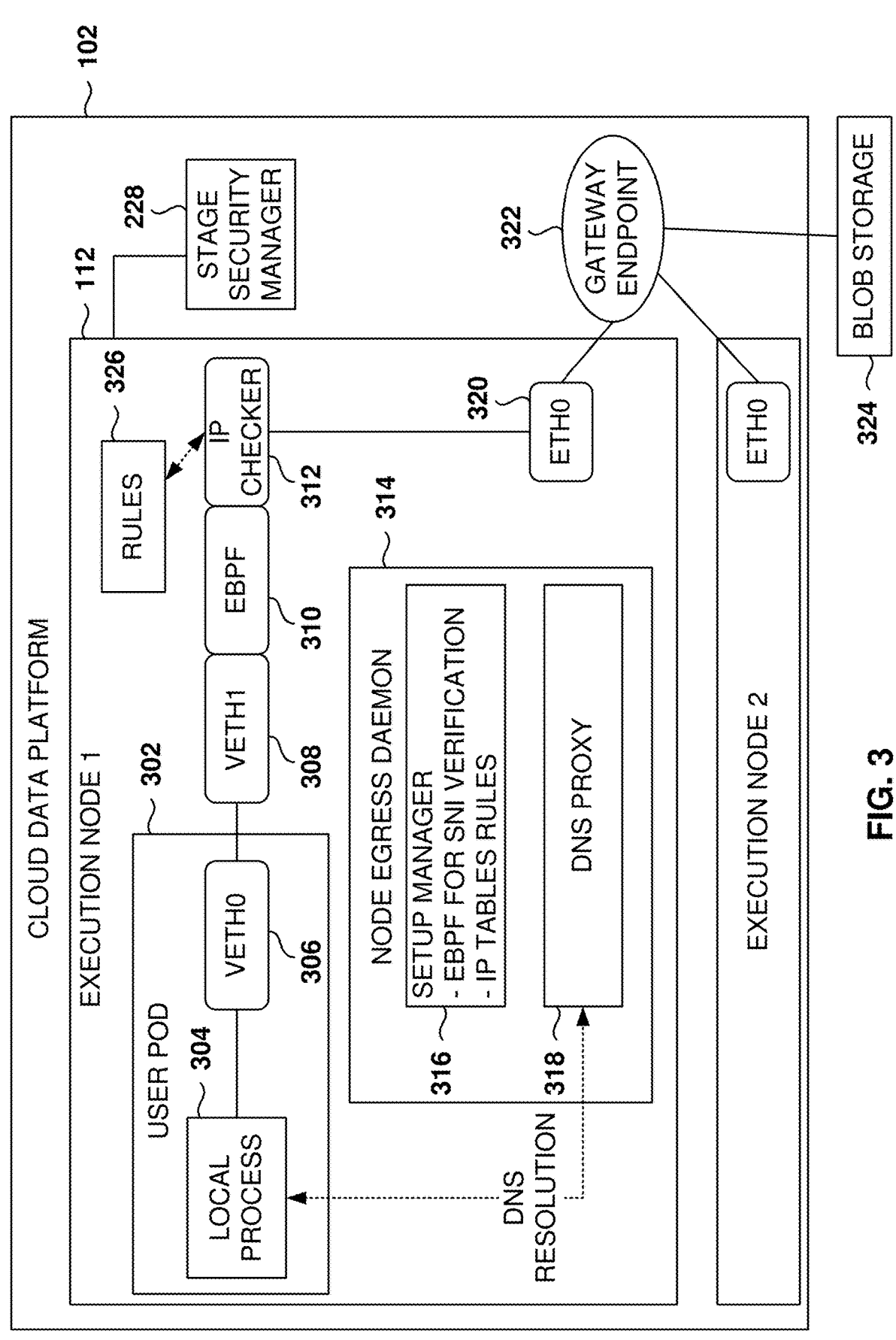
FIG. 3 is a block diagram illustrating components of the cloud data platform for securing data stages, according to some examples.

FIG. 3 is a block diagram illustrating components of the cloud data platform 102 for securing access to internal data stages, according to some examples.

In some examples, the cloud data platform 102 includes one or more execution nodes. In the illustrated example, there are two execution nodes, execution node 1 and execution tion node 2, but other embodiments may have one working node or more than two working nodes. In FIG. 3, execution node 112 is shown in detail.

The execution node 112 comprises a user pod 302, which includes a local process 304 connected to a virtual ethernet interface (veth0 306). The local process 304 is a process executing software instructions using the processor of the execution node 112. The local process 304 may execute any app, such as an app developed by the user or an app obtained from a third party. Other examples may include additional user pods within the execution node 112.

Within user pod 302, veth0 306 is connected to another virtual ethernet interface (veth1 308), which in turn is connected to an Extended Berkeley Packet Filter (EBPF 310). The EBPF 310 is linked to an IP checker 312, which verifies the Internet Protocol (IP) addresses against an IP table for Network Address Translation (NAT).

NAT is a method used to modify the IP address in the headers of IP packets while in transit by mapping a private (internal) IP address to a public (external) IP address and vice versa. The private IP address is used within a local network and is not routable on the public Internet, and the public IP address is routable on the Internet and is used to communicate with external networks.

The execution node 112 further includes a node egress daemon 314, which is a process that includes a setup manager 316 and a DNS proxy 318. The setup manager 316 is responsible for configuring the EBPF 310 for Server Name Indication (SNI) verification and the IP checker 312, which includes rules 326. The DNS proxy 318 performs DNS resolution for the user pod 302. DNS is a hierarchical and decentralized naming system used to resolve human-readable domain names (e.g., example.com) into IP addresses (e.g., 192.0.1.2).

The IP checker 312 is a program that can be configured to set the rules 326 to filter IP packets. Each rule 326 is associated with a condition to be applied to an IP address in the packet (e.g., the destination IP address) and an action to be performed when the condition is satisfied. For example, a rule may be to "drop any packets where the destination IP address is not 10.1.2.3." In some examples, the program iptables developed by Netfilter is used, but any other program may be used to filter packets based on configurable rules. The IP checker may perform additional tasks, such as NAT.

The IP checker 312 stores information to translate internal IP addresses to external IP addresses. That is, for each internal IP address, there is an entry in the table with the internal IP address and the corresponding external IP address. In this context, when an IP packet is transmitted with the destination of the internal IP address, the IP checker 312 translates the local IP address to the external IP address for transmittal on the network with the gateway endpoint 322.

In some examples, the IP checker 312 limits the IP address that may be used for traffic on the network based on the rules 326; that is, if a packet is sent with an unauthorized IP address (e.g., the unauthorized IP address is not in the rules that define which are the allowed destination IP addresses), the IP checker 312 will drop the packet. This feature will block the malicious app executing on the user pod 302 from sending messages to destinations outside the control and safety of the account of the user.

SNI is an extension of the Transport Layer Security (TLS) protocol, which is used to secure connections over a computer network. SNI allows a client (e.g., a web browser) to specify the hostname of the server it wants to connect to during the TLS handshake process. This is useful when multiple domains are hosted on the same IP address, which is common in virtual hosting environments.

During the initial phase of the TLS handshake, the client transmits a message to the server that includes the hostname to which it wishes to establish a connection. The server then uses this information to select the appropriate SSL/TLS certificate for that hostname, enabling the server to serve the correct certificate even when multiple domains share the same IP address.

The IP checker 312 IP checker is connected to an ethernet interface (Eth0 320), which facilitates communication with the gateway endpoint 322. The gateway endpoint 322 is responsible for directing traffic to blob storage 324 for data storage purposes. In the context of Amazon Web Services (AWS), a gateway endpoint is a type of Virtual Private Cloud (VPC) endpoint that allows secure connections from the VPC to AWS services.

Additionally, the execution node 112 is connected to the stage security manager 228, which manages the stage security for the execution node 112. The stage security manager 228 configures the security parameters when the execution node 112 is created, including parameters for the node egress daemon 314, the unique hostname AHID, the EBPF 310, and the IP checker 312, which includes the rules 326.

One goal of the cloud data platform 102 is to keep the user data within the governance and security framework of the cloud data platform 102. This includes ensuring that data cannot be exfiltrated from one account to another.

A vulnerability arises when the user executes an app created by a third party. This execution presents a risk of data exfiltration from one account to another through the use of internal stages. Internal stages are abstractions built on top of blob storage systems, such as Amazon S3. For example, a storage path may be represented as S3://bucket/JohnDoe, where "JohnDoe" serves as a suffix designating a specific stage of the user.

The identified vulnerability resembles a Trojan horse attack, where malicious code is introduced into the user's environment. Once operational within the user account, the application may facilitate the unauthorized transfer of data to another user.

In some examples, the outbound traffic, referred to as egress traffic, is routed through the gateway endpoint 322 (e.g., gateway within the AWS VPC). For example, a write operation to the staging area (blob storage 324) is performed with a PUT operation.

Control over DNS resolution and data flow is maintained through the virtual Ethernet pair of veth0 306 and veth1 308. A job or application executed within the cloud data platform 102 is ultimately deployed into a pod running on a node, such as the user pod 302 in the execution node 112. Network communication from the user pod 302 is managed using the virtual Ethernet pair veth0 306 and veth1 308. That is, one end of this pair resides within the user pod 302, while the other end is located on the execution node 112 outside the user pod 302.

The node egress daemon 314 controls networking-related functionality associated with that specific node, such as managing hostnames and IP addresses. DNS resolution requests are processed by the DNS proxy 318 in the node egress daemon 314, ensuring oversight of DNS resolution within the execution node 112.

EBPF is a technology initially designed for packet filtering in the Linux kernel, but it has evolved into a general-purpose framework for running custom, sandboxed programs in various parts of the kernel. In the area of networking, EBPF can be used for load balancing, traffic filtering, and deep packet inspection. Although EBPF is described as a filtering technology in the illustrated example, any other type of filtering software may be used to inspect outgoing packets to check the SNI handshake.

In some examples, the EBPF 310 module is configured to intercept and analyze packages transmitted through the veth1 308. This interception enables the examination of outgoing packets, allowing for the implementation of specific actions based on the content of the packets. In some examples, the EBPF 310 intercepts the packages associated with the TLS handshake process to verify the SNI name field.

The EBPF 310 ensures that the traffic is directed to the specific internal staging host AHID associated with the user account. To achieve this, the TLS packet is intercepted, and the SNI name field is extracted and validated against the expected authorized value of the AHID for the account. If the AHID is not the authorized value, then the TLS package is dropped, and the TLS handshake will fail, thereby disabling communication with an unauthorized host. The TLS packet that does not match the expected criteria is discarded, and the event is logged for record-keeping.

If the AHID is correct, the TLS packet is forwarded, and the TLS handshake is completed so data transfer can take place after the control path has been verified. It is noted that during the data transfer phase, no modifications to the packages are performed, and there is no performance degradation, as the data remains encrypted to ensure that the content sent by the user is not intercepted or analyzed.

In some examples, the cloud data platform 102 ensures that each host identifier, in the context of the TLS requests, is unique for each account. This includes verifying that each host has a unique host identifier and, during operational phases, confirming that each TLS request corresponds to the designated host identifier. This mechanism serves as a security filter, directing requests exclusively to the appropriate unique hostname configured by the cloud data platform 102.

Additionally, the process ensures the uniqueness of hostnames, e.g., in the context of Amazon Web Services (AWS). An S3 (Simple Storage Service) Access Point (AP) is a feature in AWS that simplifies and enhances the management of access to shared data stored in Amazon S3. Access points have unique DNS names and policies, which can be tailored to specific use cases, applications, or sets of users. S3 provides unique, dedicated DNS names for each access point. This allows for easier and more consistent access to S3 buckets by applications, especially in scenarios where different applications or users access the same bucket in different ways.

In AWS, the implementation of S3 Access Points is necessary to guarantee that hostnames remain unique across accounts. In some examples, the cloud data platform 102 allows for shared access to a limited number of S3 buckets, where multiple accounts can utilize the same bucket with distinct suffixes.

In some examples, the techniques for stopping malicious apps from stealing user data include three features:

1. The unique block-storage hostname per account AHID is implemented to ensure that the unique hostname is used for the block-storage service. This enables the data platform to block cross-account data exfiltration. If the AHID of an account is used in another account, then the cloud data platform will disable communications using the AHID of the other account, preventing data breaches.

2. Control of DNS by the DNS proxy 318 to limit the hostname resolution to the unique AHID hostname of the account. DNS requests for hostnames different from the AHID are denied, ensuring that an attacker cannot submit DNS requests for a malicious destination.

3. Filter SNI requests at the EBPF 310. The SNI filtering inspects the TLS handshake for each connection and makes sure that the hostname in the request is for the allowed unique AHID; otherwise, the TLS handshake is disallowed and cannot be bypassed, thereby disabling the app from communicating with a different host.

To address the challenge of non-unique hostnames when multiple accounts share the same S3 bucket, the cloud data platform 102 distinguishes hosts by adding a layer of access management, thereby ensuring that each hostname is unique within the AWS environment.

The SNI checking is characterized by its proxy-less feature, which allows SNI checking to occur directly on the execution node 112 rather than through an external third-party gateway or another node. This eliminates the possibility of a man-in-the-middle attack.

Each worker node is configured with a specific DNS setup, which restricts the resolution of hostnames. In some examples, control of DNS resolution is enforced by the DNS proxy 318. The unique AHID of each account is enforced by the DNS proxy 318; that is, the AHID of the account will be resolved, but other hostnames will not be resolved. The cloud data platform 102 ensures that the DNS proxy 318 is used for DNS resolution in the execution node 112.

In some examples, the ISURL for the internal stage is formed by combining the AHID with a suffix for the stage as follows:

{AHID for user account}/{suffix for stage path}

The path suffix contains the address for the stage. When the user pod 302 requests a PUT to the internal stage, the user pod 302 gets the ISURL to be used for the destination.

For instance, if the AHID is joesmith.sa.com and the suffix is stageid, then the ISURL is joesmith.sa.com/stageid. The DNS proxy 318 will check the AHID joesmith.sa.com for the name resolution. A request for joesmith.sa.com will succeed in this account, but a DNS request with the AHID of another account (e.g., janedoe.sa.com) will not be resolved, and the user pod 302 will not be able to obtain a destination IP address.

During setup, the DNS proxy 318 is configured by the stage security manager 228 to allow resolution for the designated hostname, like the AHID, while other domains are denied. In some examples, one AHID is programmed into the DNS proxy, and only that AHID is resolvable. Other examples may enable other authorized hostnames for other types of communication.

In some examples, the SNI is verified by the EBPF 310, which includes a code segment attached to the veth1 308 interface. During the Transport Layer Security (TLS) handshake with a specified host, the initial packet is intercepted by the EBPF 310, and the name in the SNI is validated. Every outgoing packet is processed by the EBPF 310, and if the EBPF 310 detects an SNI packet, the EBPF 310 extracts the SNI and validates that the SNI is in a list of predefined allowed SNI values. If the outgoing packet includes a valid SNI (e.g., the AHID), then the packet is approved for transmission, and if the outgoing packet includes an unauthorized SNI value, then the packet is dropped.

Pod-escaping refers to a scenario in which an entity gains pseudo access to the host machine, allowing for the escape from the container and achieving root-level access on the machine. In such cases, certain defenses may fail, particularly the SNI check and the DNS Proxy, as these mechanisms are confined to the pod context. To mitigate this risk, IP addresses are controlled to enable authorized IP addresses and disable other IP addresses. The rules 326, enforced by the IP checker 312, define when to block unauthorized access.

The rules 326 are configured and enforced by the IP checker 312 to manage connections to specific S3 IP addresses. When a Hypertext Transfer Protocol (HTTP) request is made to the unique host ID, the DNS resolution directs the sender to use a designated local IP address (e.g., 192.168.0.5); that is, the DNS proxy 318 resolves the special unique host ID to this link-local IP address. The IP checker 312 performs NAT to map the local IP address to an external IP address routable on the Internet through the gateway endpoint 322 for the blob storage 324 (e.g., Amazon S3 or Azure Blob Storage). The external IP address will direct the traffic to the storage of the account. If an IP address other than the designated local IP address is used (e.g., an external routable Internet IP address), the IP checker 312 will drop the packet. This way, external IP addresses may not be used within the user pod 302.

Within the execution node 112, when the user pod 302 requests the PUT to its internal stage, the user pod 302 gets the ISURL to its internal stage, which includes the AHID of the account. The user pod 302 utilizes the authentication session token from the cloud data platform 102.

The user pod 302 does a DNS lookup of the AHID to the DNS proxy 318 and gets the corresponding internal IP address to be used as the destination for IP packets. The user pod 302 then sends blob-storage traffic to the internal IP address via the veth0 306, which sends the traffic to the veth1 308. Also, the IP checker 312 checks the internal IP address and performs address translation to the stage address, and the packets will be routed to the gateway endpoint 322 via the Eth0 320 to reach the blob storage 324.

Two attack scenarios are described to show how the techniques presented will block these attacks. A PUT command is an HTTP method used to update an existing resource or create a new resource at a specific URL. The first attack relates to the SQL PUT command, where the attacker issues a PUT command in the account of the victim in the cloud data platform 102 and captures the authentication token for the connection. Then, the attacker may try to use this authentication token in another account to save the data using the attacker's authentication token instead of the authentication token of the user that owns the pod.

In the second attack, a PUT command is issued from the attacker's app or other malicious code to escape the user pod 302 and grab the user's authentication token. This authentication token may then be used in the attacker's account (e.g., attacker's pod) to access the user's data from outside the user account.

When the attacker generates a token to their internal stage through any of the two attack cases, the token will be either in the native S3 bucket URL format (case 1) or in the AP URL of the attacker's account (case 2). In both cases, traffic to the blob storage 324 will fail the DNS lookup, so it will not get the internal IP address, and the IP checker 312 will drop packets that are not directed to the internal IP address.

A sophisticated attacker can try other attacks, such as snooping legitimate DNS lookups and finding this address from the packet capture. However, the use of the SNI check by the EBPF 310, to ensure that the hostname matches the AHID for the account, will cause the TLS connection to fail, and the attack will be diverted, even if the malicious user is able to obtain the unique hostname used within the user pod 302.

Thus, the presented techniques prevent cross-account data exfiltration in a multi-tenant environment for the cloud data platform 102. Apart from having unique hostnames for blob storage per account, there are no additional requirements. The customer data and traffic stay encrypted, and there are no requirements to be implemented by the blob storage provider. The additional resources used to implement the solution are related to reading a constant number of metadata packets, which are already in cleartext in the customer traffic. Thus, there are no packet copy required, and there is an extremely low impact on performance to implement these techniques.

Figure 4:
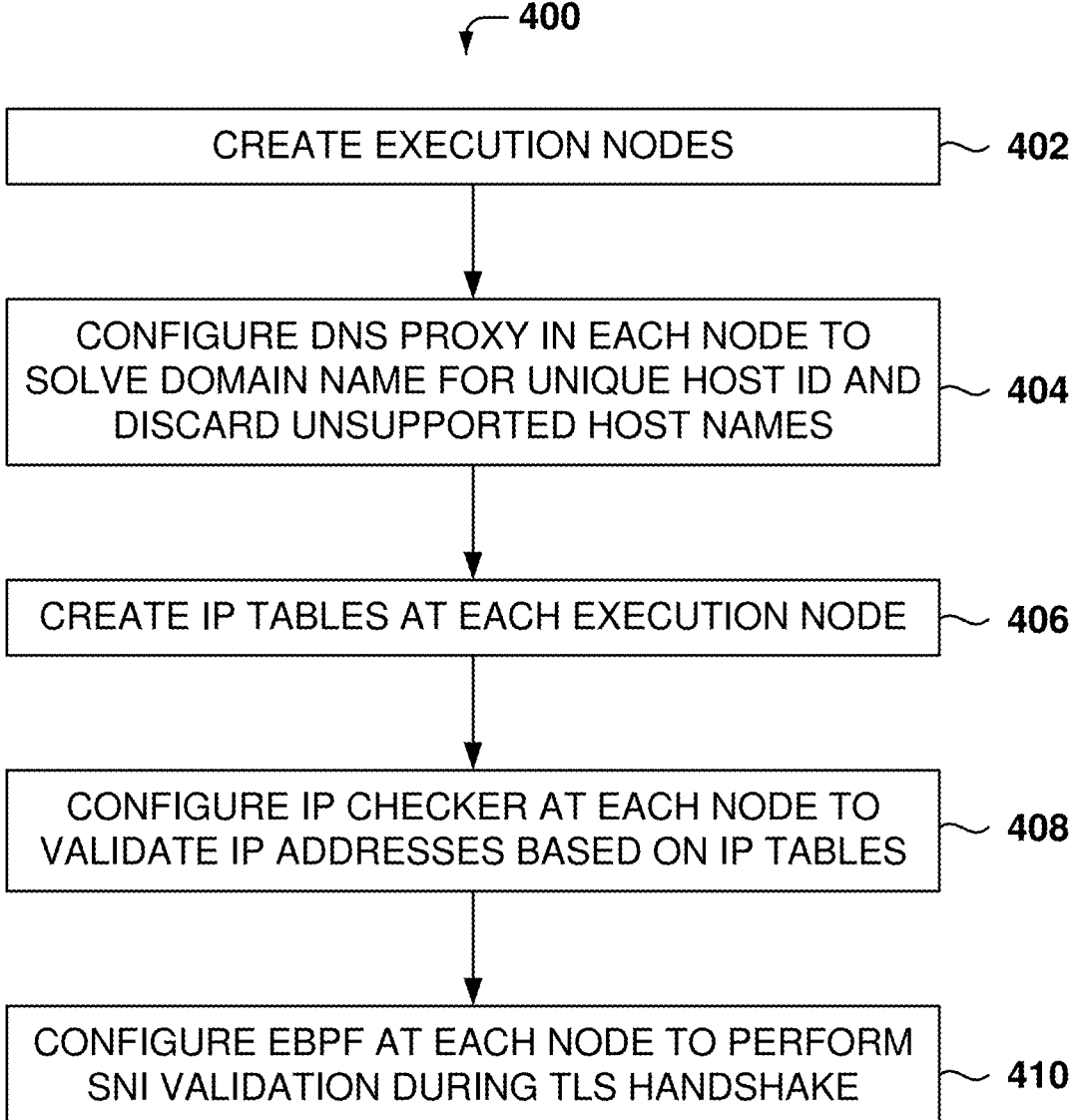
FIG. 4 is a flowchart of a method for setting up worker nodes for secure access, according to some examples.

FIG. 4 is a flowchart of a method 400 for setting up worker nodes for secure access, according to some examples. While the various operations in this flowchart are presented and described sequentially, one of ordinary skill will appreciate that some or all of the operations may be executed in a different order, be combined or omitted, or be executed in parallel.

Operation 402 is for creating one or more execution nodes. This includes allocating resources, initializing the nodes, and preparing the nodes for subsequent configuration.

From operation 402, the method 400 flows to operation 404 for configuring the DNS proxy in each node to solve domain names for the unique host ID and discard DNS requests for unsupported hostnames. This operation involves setting up the DNS proxy to manage domain name resolution requests and enable the resolution of the AHID while not resolving DNS requests for the AHID of accounts other than the account where the execution node is executing.

The DNS Proxy is configured through the node egress daemon. The DNS Proxy at the node possesses sufficient information to resolve all DNS requests independently. Once the setup is complete, the DNS Proxy does not require further interaction with external systems, such as the control plane of the cloud data platform 102 for DNS resolution.

From operation 404, the method 400 flows to operation 406 for creating the IP tables used for NAT at each execution node. The IP tables are configured to control network traffic and perform NAT to convert internal IP addresses to external IP addresses associated with the account. One entry in the IP tables is to translate the authorized internal IP address to the authorized external IP address for storage access.

From operation 406, the method 400 flows to operation 408 to configure the IP checker at each node to validate IP addresses based on the IP tables. This operation ensures that any network communication involving the execution nodes adheres to the predefined security policies.

From operation 408, the method 400 flows to operation 410 for configuring the EBPF at each node to perform SNI validation during TLS handshakes. If an SNI request is detected associated with a hostname different from the AHID, the TLS handshake will fail, and the connection will not be established.

Once the setup is complete, the worker node can communicate via the network. When the execution node performs a DNS request, the DNS proxy 318 will only respond with the local IP address for accessing the stage if the name requested is associated with the AHID. Otherwise, the DNS request will fail.

Further, the IP checker 312 translates internal IP addresses to the stage IP address on the network. The IP checker 312 guarantees that any IP address is matched to an IP address that stores stages from the user account. Thus, the user pod 302 can't access a stage that does not belong to the user account.

Figure 5:
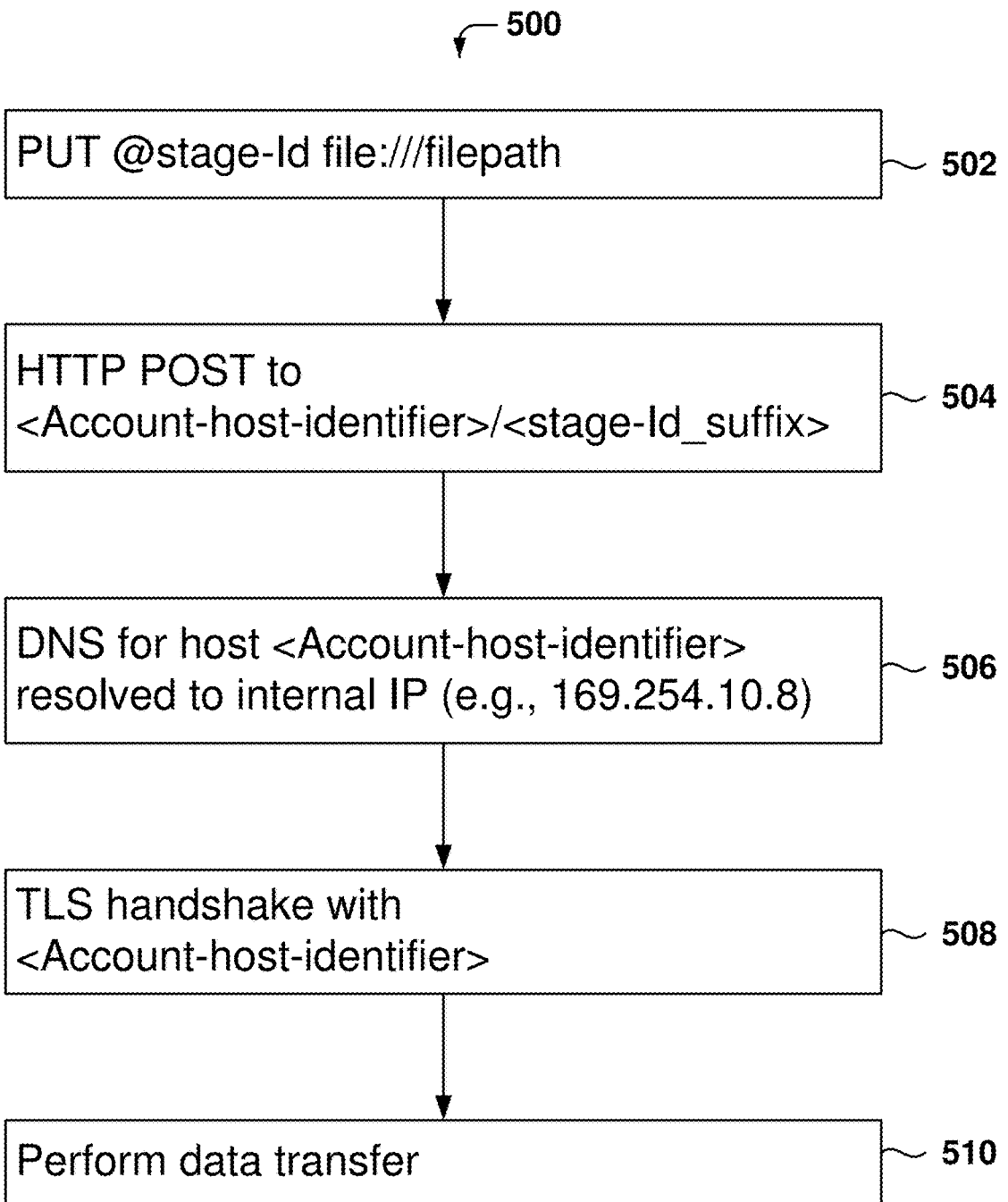
FIG. 5 is a flowchart of a method for secure stage access, according to some examples.

FIG. 5 is a flowchart of a method 500 for secure stage access, according to some examples.

At operation 502, a PUT request is received for a stage stage-Id:

PUT @stage-Id file:///filepath

This request generates a query to the control plane layer. The cloud data platform 102 retrieves the stage URL.

From operation 502, the method 500 flows to operation 504 for generating an HTTP POST request. An HTTP POST is a method used in the Hypertext Transfer Protocol (HTTP) to send data to a server to create or update a resource. When a client wants to send data to a server, the client uses the HTTP POST request to submit the data in the body of the request.

Based on the PUT request, the HTTP POST request is generated (e.g., by the local process 304) as follows:

HTTP POST to <Account-host-identifier>/<stage-id_prefix>

To enforce the uniqueness of the AHID within Amazon Web Services (AWS), S3 Access Points are utilized. These access points facilitate the creation of account-specific hostnames, ensuring that each account possesses a unique hostname linked to it. In AWS deployments, the internal stage corresponds to a specific prefix in an AWS S3 bucket.

From operation 504, the method 500 flows to operation 506 to process a DNS request for the host <Account-host-identifier>. If the request is for the correct AHID of the account, the DNS proxy will return the internal local IP address, and if the request is for another AHID of a different account, then the DNS request will fail, and no IP address will be returned.

From operation 506, the method 500 flows to operation 508, where a TLS handshake is detected to establish the connection to transfer the data. The EBPF validates the name in the SNI during the TLS handshake. The EBPF only enables the establishment of the connection if the hostname in the SNI request is the AHID; otherwise, the EBPF will drop the package, and the TLS handshake will fail.

From operation 508, the method 500 flows to operation 510 for performing data transfer using the HTTP POST command if the DNS resolution and the TLS handshake are successful. This operation involves the actual transmission of data from the client to the server over the established secure channel. The data transfer is conducted using the secure connection established in the previous operations, ensuring that the data remains confidential and protected from unauthorized access.

FIG. 6 is a flowchart of a method 600 for protecting data in a VPC implementation, according to some examples. While the various operations in this flowchart are presented and described sequentially, one of ordinary skill will appreciate that some or all of the operations may be executed in a different order, be combined or omitted, or be executed in parallel.

Operation 602 is for configuring a Domain Name System (DNS) proxy, that is executing in a node of a cloud data platform associated with a first account, to perform hostname resolution of an Account Host Identifier (AHID) of the first account.

From operation 602, the method 600 flows to operation 604 for receiving, by the DNS proxy, a DNS request from a process executing in a pod of the node.

From operation 604, the method 600 flows to operation 606 for failing to resolve the DNS request in response to a name in the DNS request being different from the AHID of the first account.

From operation 606, the method 600 flows to operation 608 for returning an Internet Protocol (IP) address in response to determining that the name in the DNS request matches the AHID. The process executing in the pod of the node is configured to send data to data storage of the cloud data platform using the IP address.

In some examples, each account of the cloud data platform is associated with a unique AHID for the account.

In some examples, the method 600 further comprises configuring a filter in the node to check a hostname during a handshake to establish a connection by the process executing in the pod of the node, where the filter enables establishing the connection when the hostname in the handshake is the AHID of the first account.

In some examples, the method 600 further comprises detecting, by the filter in the node, a connection request; and disabling, by the filter, the connection request in response to detecting that the connection request is for a hostname different from the AHID of the first account.

In some examples, the method 600 further comprises configuring an IP checker, that is executing in the node, to perform network address translation (NAT) for the process executing in the pod of the node, where the IP checker resolves the IP address to an external IP address for storage associated with the first account in the cloud data platform.

In some examples, configuring the IP checker further comprises configuring rules for filtering packets based on IP address.

In some examples, the method 600 further comprises examining, by the IP checker, a packet sent by the process executing in the pod of the node; and dropping, by the IP checker, the packet in response to determining that an outgoing address in the packet is not associated with the first account.

In some examples, the method 600 further comprises translating, by the IP checker, the outgoing address to an external IP address in response to determining that the outgoing address in the packet is associated with the first account; and forwarding the packet to the external IP address.

In some examples, the node of the cloud data platform comprises the pod, the pod comprising the process and a first virtual network interface; a second virtual network interface coupled to the first virtual interface; a filter coupled to the second virtual interface; an IP checker coupled to the filter; and a network interface for network communications to devices outside the node.

In some examples, the cloud data platform comprises a gateway endpoint coupled to the network interface of the node.

Given the disclosure above, various examples are set forth below. It should be noted that one or more features of an example, taken in isolation or combination, should be considered within the disclosure of this application.

Another general aspect is for a system that includes a memory comprising instructions and one or more computer processors. The instructions, when executed by the one or more computer processors, cause the one or more computer processors to perform operations comprising: configuring a Domain Name System (DNS) proxy, that is executing in a node of a cloud data platform associated with a first account, to perform hostname resolution of an Account Host Identifier (AHID) of the first account; receiving, by the DNS proxy, a DNS request from a process executing in a pod of the node; failing to resolve the DNS request in response to a name in the DNS request being different from the AHID of the first account; and returning an Internet Protocol (IP) address in response to determining that the name in the DNS request matches the AHID, the process executing in the pod of the node being configured to send data to data storage of the cloud data platform using the IP address.

In yet another general aspect, a tangible machine-readable storage medium (e.g., a non-transitory storage medium) includes instructions that, when executed by a machine, cause the machine to perform operations comprising configuring a Domain Name System (DNS) proxy, that is executing in a node of a cloud data platform associated with a first account, to perform hostname resolution of an Account Host Identifier (AHID) of the first account; receiving, by the DNS proxy, a DNS request from a process executing in a pod of the node; failing to resolve the DNS request in response to a name in the DNS request being different from the AHID of the first account; and returning an Internet Protocol (IP) address in response to determining that the name in the DNS request matches the AHID, the process executing in the pod of the node being configured to send data to data storage of the cloud data platform using the IP address.

Figure 7:
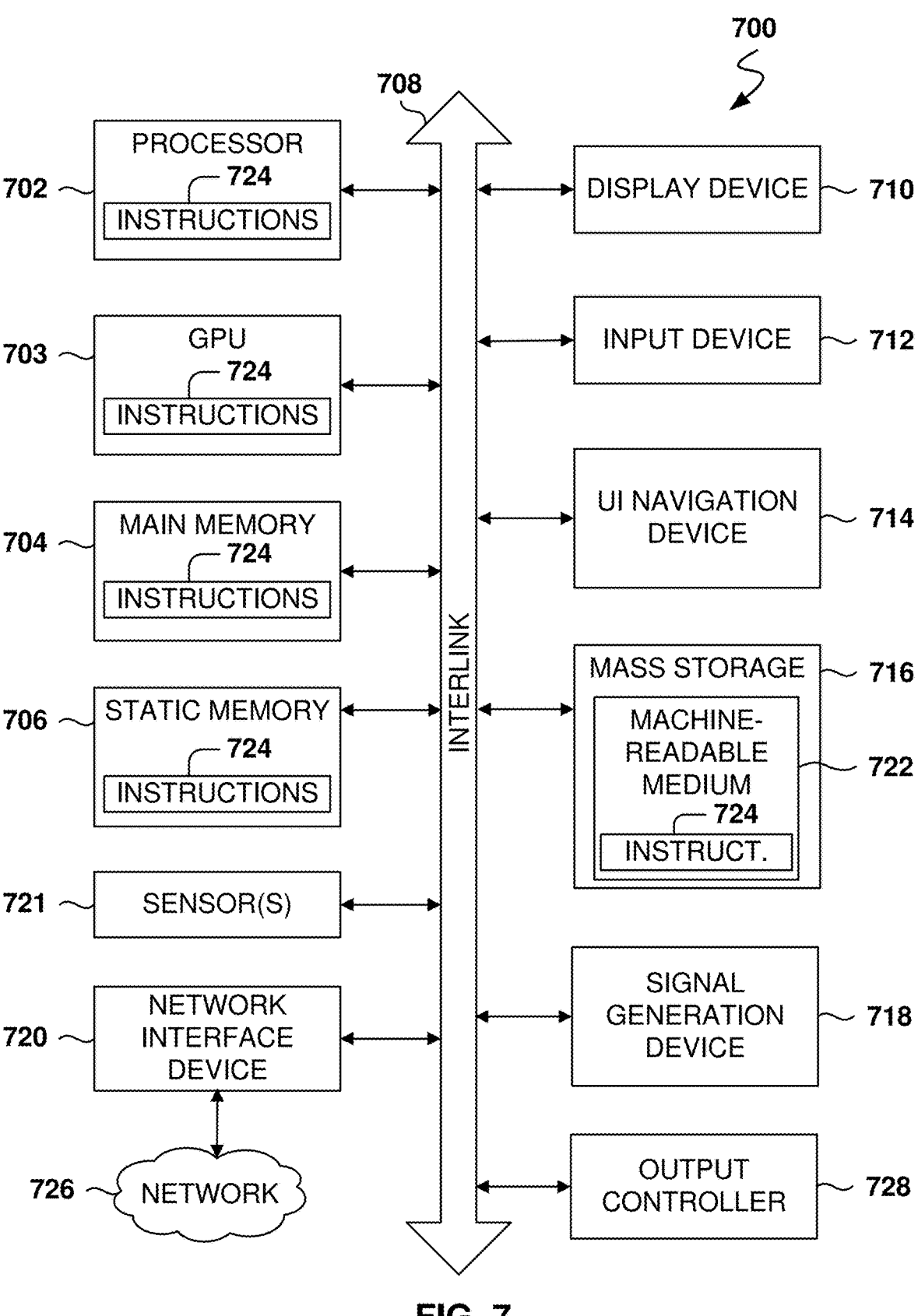
FIG. 7 is a block diagram illustrating an example of a machine upon or by which one or more example process examples described herein may be implemented or controlled.

FIG. 7 is a block diagram illustrating an example of a machine 700 upon or by which one or more example process examples described herein may be implemented or controlled. In alternative examples, the machine 700 may operate as a standalone device or be connected (e.g., networked) to other machines. In a networked deployment, the machine 700 may operate in the capacity of a server machine, a client machine, or both in server-client network environments. In an example, the machine 700 may act as a peer machine in a peer-to-peer (P2P) (or other distributed) network environment. Further, while only a single machine 700 is illustrated, the term "machine" shall also be taken to include any collection of machines that individually or jointly execute a set (or multiple sets) of instructions to perform any one or more of the methodologies discussed herein, such as via cloud computing, software as a service (SaaS), or other computer cluster configurations.

Examples, as described herein, may include, or may operate by, logic, various components, or mechanisms. Circuitry is a collection of circuits implemented in tangible entities, including hardware (e.g., simple circuits, gates, logic). Circuitry membership may be flexible over time and underlying hardware variability. Circuitries include members that may, alone or in combination, perform specified operations when operating. In an example, the hardware of the circuitry may be immutably designed to carry out a specific operation (e.g., hardwired). In an example, the hardware of the circuitry may include variably connected physical components (e.g., execution units, transistors, simple circuits), including a computer-readable medium physically modified (e.g., magnetically, electrically, by moveable placement of invariant massed particles) to encode instructions of the specific operation. In connecting the physical components, the underlying electrical properties of a hardware constituent are changed (for example, from an insulator to a conductor or vice versa). The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other circuitry components when the device operates. In an example, any of the physical components may be used in more than one member of more than one circuitry. For example, under operation, execution units may be used in a first circuit of a first circuitry at one point in time and reused by a second circuit in the first circuitry or by a third circuit in a second circuitry at a different time.

The machine 700 (e.g., computer system) may include a hardware processor 702 (e.g., a central processing unit (CPU), a hardware processor core, or any combination thereof), a graphics processing unit (GPU 703), a main memory 704, and a static memory 706, some or all of which may communicate with each other via an interlink 708 (e.g., bus). The machine 700 may further include a display device 710, an alphanumeric input device 712 (e.g., a keyboard), and a user interface (UI) navigation device 714 (e.g., a mouse). In an example, the display device 710, alphanumeric input device 712, and UI navigation device 714 may be a touch screen display. The machine 700 may additionally include a mass storage device 716 (e.g., drive unit), a signal generation device 718 (e.g., a speaker), a network interface device 720, and one or more sensors 721, such as a Global Positioning System (GPS) sensor, compass, accelerometer, or another sensor. The machine 700 may include an output controller 728, such as a serial (e.g., universal serial bus (USB)), parallel, or other wired or wireless (e.g., infrared (IR), near field communication (NFC)) connection to communicate with or control one or more peripheral devices (e.g., a printer, card reader).

The processor 702 refers to any one or more circuits or virtual circuits (e.g., a physical circuit emulated by logic executing on an actual processor) that manipulates data values according to control signals (e.g., commands, opcodes, machine code, control words, macroinstructions, etc.) and which produces corresponding output signals that are applied to operate a machine. A processor 702 may, for example, include at least one of a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), a Tensor Processing Unit (TPU), a Neural Processing Unit (NPU), a Vision Processing Unit (VPU), a Machine Learning Accelerator, an Artificial Intelligence Accelerator, an Application Specific Integrated Circuit (ASIC), a Field Programmable Gate Array (FPGA), a Radio-Frequency Integrated Circuit (RFIC), a Neuromorphic Processor, a Quantum Processor, or any combination thereof.

The processor 702 may further be a multi-core processor having two or more independent processors (sometimes referred to as "cores") that may execute instructions contemporaneously. Multi-core processors contain multiple computational cores on a single integrated circuit die, each of which can independently execute program instructions in parallel. Parallel processing on multi-core processors may be implemented via architectures like superscalar, VLIW, vector processing, or SIMD that allow each core to run separate instruction streams concurrently. The processor 702 may be emulated in software, running on a physical processor, as a virtual processor or virtual circuit. The virtual processor may behave like an independent processor but is implemented in software rather than hardware.

The mass storage device 716 may include a machine-readable medium 722 on which one or more sets of data structures or instructions 724 (e.g., software) embodying or utilized by any of the techniques or functions described herein. The instructions 724 may also reside, completely or at least partially, within the main memory 704, within the static memory 706, within the hardware processor 702, or the GPU 703 during execution thereof by the machine 700. For example, one or any combination of the hardware processor 702, the GPU 703, the main memory 704, the static memory 706, or the mass storage device 716 may constitute machine-readable media.

While the machine-readable medium 722 is illustrated as a single medium, the term "machine-readable medium" may include a single medium or multiple media (e.g., a centralized or distributed database and associated caches and servers) configured to store one or more instructions 724.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The term "machine-readable medium" may include any medium that is capable of storing, encoding, or carrying instructions 724 for execution by the machine 700 and that causes the machine 700 to perform any one or more of the techniques of the present disclosure or that is capable of storing, encoding, or carrying data structures used by or associated with such instructions 724. Non-limiting machine-readable medium examples may include solid-state memories and optical and magnetic media. For example, a massed machine-readable medium comprises a machine-readable medium 722 with a plurality of particles having invariant (e.g., rest) mass. Accordingly, massed machine-readable media are not transitory propagating signals. Specific examples of massed machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 724 may be transmitted or received over a communications network 726 using a transmission medium via the network interface device 720.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented separately. These and other variations, modifications, additions, and improvements fall within the scope of the subject matter herein.

The examples illustrated herein are described in sufficient detail to enable those skilled in the art to practice the teachings disclosed. Other examples may be used and derived therefrom, such that structural and logical substitutions and changes may be made without departing from the scope of this disclosure. The Detailed Description, therefore, is not to be taken in a limiting sense, and the scope of various examples is defined only by the appended claims, along with the full range of equivalents to which such claims are entitled.

Additionally, as used in this disclosure, phrases of the form "at least one of an A, a B, or a C," "at least one of A, B, and C," and the like should be interpreted to select at least one from the group that comprises "A, B, and C." Unless explicitly stated otherwise in connection with a particular instance, in this disclosure, this manner of phrasing does not mean "at least one of A, at least one of B, and at least one of C." As used in this disclosure, the example "at least one of an A, a B, or a C" would cover any of the following selections: {A}, {B}, {C}, {A, B}, {A, C}, {B, C}, and {A, B, C}.

Moreover, plural instances may be provided for resources, operations, or structures described herein as a single instance. Additionally, boundaries between various resources, operations, modules, engines, and data stores are somewhat arbitrary, and particular operations are illustrated in the context of specific illustrative configurations. Other allocations of functionality are envisioned and may fall within the scope of various examples of the present disclosure. In general, structures and functionality are presented as separate resources in the example; configurations may be implemented as a combined structure or resource. Similarly, structures and functionality presented as a single resource may be implemented as separate resources. These and other variations, modifications, additions, and improvements fall within a scope of examples of the present disclosure as represented by the appended claims. Accordingly, the specification and drawings are to be regarded in an illustrative rather than a restrictive sense.

What is claimed is:

1. A system comprising:
a memory comprising instructions; and
one or more computer processors, the instructions, when executed by the one or more computer processors, causing the system to perform operations comprising:
configuring a Domain Name System (DNS) proxy, that is executing in a node of a cloud data platform associated with a first account, to perform hostname resolution of an Account Host Identifier (AHID) of the first account;
receiving, by the DNS proxy, a DNS request from a process executing in a pod of the node;
failing to resolve the DNS request in response to a name in the DNS request being different from the AHID of the first account;
returning an Internet Protocol (IP) address in response to determining that the name in the DNS request matches the AHID, the process executing in the pod of the node being configured to send data to data storage of the cloud data platform using the IP address;
configuring a filter in the node to check a hostname during a handshake to establish a connection by the process executing in the pod of the node, wherein the filter enables establishing the connection when the hostname in the handshake is the AHID of the first account;
detecting, by the filter in the node, a connection request; and
disabling, by the filter, the connection request in response to detecting that the connection request is for a hostname different from the AHID of the first account.

2. The system as recited in claim 1, wherein each account of the cloud data platform is associated with a unique AHID for the account.

3. The system as recited in claim 1, wherein the instructions further cause the one or more computer processors to perform operations comprising:
configuring an IP checker, that is executing in the node, to perform network address translation (NAT) for the process executing in the pod of the node, wherein the IP checker resolves the IP address to an external IP address for storage associated with the first account in the cloud data platform.

4. The system as recited in claim 3, wherein configuring the IP checker further comprises:
configuring rules for filtering packets based on IP address.

5. The system as recited in claim 3, wherein the instructions further cause the one or more computer processors to perform operations comprising:
examining, by the IP checker, a packet sent by the process executing in the pod of the node; and
dropping, by the IP checker, the packet in response to determining that an outgoing address in the packet is not associated with the first account.

6. The system as recited in claim 5, wherein the instructions further cause the one or more computer processors to perform operations comprising:
translating, by the IP checker, the outgoing address to an external IP address in response to determining that the outgoing address in the packet is associated with the first account; and
forwarding the packet to the external IP address.

7. The system as recited in claim 1, wherein the node of the cloud data platform comprises:
the pod, the pod comprising the process and a first virtual network interface;
a second virtual network interface coupled to the first virtual interface;
a filter coupled to the second virtual interface;
an IP checker coupled to the filter; and
a network interface for network communications to devices outside the node.

8. The system as recited in claim 7, wherein the cloud data platform comprises a gateway endpoint coupled to the network interface of the node.

9. A computer-implemented method comprising:
configuring a Domain Name System (DNS) proxy, that is executing in a node of a cloud data platform associated with a first account, to perform hostname resolution of an Account Host Identifier (AHID) of the first account;
receiving, by the DNS proxy, a DNS request from a process executing in a pod of the node;
failing to resolve the DNS request in response to a name in the DNS request being different from the AHID of the first account;
returning an Internet Protocol (IP) address in response to determining that the name in the DNS request matches the AHID, the process executing in the pod of the node being configured to send data to data storage of the cloud data platform using the IP address;
configuring a filter in the node to check a hostname during a handshake to establish a connection by the process executing in the pod of the node, wherein the filter enables establishing the connection when the hostname in the handshake is the AHID of the first account;
detecting, by the filter in the node, a connection request; and
disabling, by the filter, the connection request in response to detecting that the connection request is for a hostname different from the AHID of the first account.

10. The method as recited in claim 9, wherein each account of the cloud data platform is associated with a unique AHID for the account.

11. The method as recited in claim 9, further comprising:
configuring an IP checker, that is executing in the node, to perform network address translation (NAT) for the process executing in the pod of the node, wherein the IP checker resolves the IP address to an external IP address for storage associated with the first account in the cloud data platform.

12. A machine-storage medium including instructions that, when executed by a machine, cause the machine to perform operations comprising:

configuring a Domain Name System (DNS) proxy, that is executing in a node of a cloud data platform associated with a first account, to perform hostname resolution of an Account Host Identifier (AHID) of the first account;

receiving, by the DNS proxy, a DNS request from a process executing in a pod of the node;

failing to resolve the DNS request in response to a name in the DNS request being different from the AHID of the first account;

returning an Internet Protocol (IP) address in response to determining that the name in the DNS request matches the AHID, the process executing in the pod of the node being configured to send data to data storage of the cloud data platform using the IP address;

configuring a filter in the node to check a hostname during a handshake to establish a connection by the process executing in the pod of the node, wherein the filter enables establishing the connection when the hostname in the handshake is the AHID of the first account;

detecting, by the filter in the node, a connection request; and disabling, by the filter, the connection request in response to detecting that the connection request is for a hostname different from the AHID of the first account.

13. The machine-storage medium as recited in claim 12, wherein each account of the cloud data platform is associated with a unique AHID for the account.

14. The machine-storage medium as recited in claim 12, wherein the machine further performs operations comprising:

configuring an IP checker, that is executing in the node, to perform network address translation (NAT) for the process executing in the pod of the node, wherein the IP checker resolves the IP address to an external IP address for storage associated with the first account in the cloud data platform.

*   *   *   *   *